United States Patent
Vath et al.

(10) Patent No.: US 11,994,445 B2
(45) Date of Patent: May 28, 2024

(54) CONDITION MONITORING FOR PLAIN BEARINGS BY MEANS OF STRUCTURE-BORNE NOISE

(71) Applicant: ZF Friedrichshafen AG, Friedrichshafen (DE)

(72) Inventors: Andreas Vath, Leidersbach (DE); Sebastian Schmidt, Zellingen (DE)

(73) Assignee: ZF FRIEDRICHSHAFEN AG, Friedrichshafen (DE)

( * ) Notice: Subject to any disclaimer, the term of this patent is extended or adjusted under 35 U.S.C. 154(b) by 399 days.

(21) Appl. No.: 17/045,768

(22) PCT Filed: Mar. 12, 2019

(86) PCT No.: PCT/EP2019/056087
§ 371 (c)(1),
(2) Date: Oct. 7, 2020

(87) PCT Pub. No.: WO2019/197096
PCT Pub. Date: Oct. 17, 2019

(65) Prior Publication Data
US 2021/0156763 A1    May 27, 2021

(30) Foreign Application Priority Data

Apr. 11, 2018 (DE) .................... 10 2018 205 491.6

(51) Int. Cl.
*G01M 13/045* (2019.01)
*G01M 13/021* (2019.01)
*G01M 13/028* (2019.01)

(52) U.S. Cl.
CPC ........ *G01M 13/045* (2013.01); *G01M 13/021* (2013.01); *G01M 13/028* (2013.01); *F16C 2233/00* (2013.01); *F16C 2361/61* (2013.01)

(58) Field of Classification Search
CPC ............ G01M 13/045; G01M 13/021; G01M 13/028; F16C 2233/00; F16C 2361/61
See application file for complete search history.

(56) References Cited

U.S. PATENT DOCUMENTS

| 3,712,130 A | 1/1973 | Weichbrodt et al. |
| 4,931,949 A * | 6/1990 | Hernandez .......... G01M 13/021 73/660 |

(Continued)

FOREIGN PATENT DOCUMENTS

| CN | 1756944 A | 4/2006 |
| CN | 203432784 U | 2/2014 |

(Continued)

OTHER PUBLICATIONS

Klein Ulrich, "Schingungsdiagnostische Beurteilung von Maschinen und Anlagen", vol. 2, Stahleisen GmbH, Dec. 2000, pp. 89-112 and 122-130.

*Primary Examiner* — Lisa M Caputo
*Assistant Examiner* — Cynthia L Davis
(74) *Attorney, Agent, or Firm* — LEYDIG, VOIT & MAYER, LTD.

(57) ABSTRACT

A method for determining an operating condition of at least one plain bearing includes measuring, by a sensor, structure-borne noise arising from a toothed engagement of a first gear and a second gear, wherein the first gear is rotatably mounted via the plain bearing and meshes with the second gear. The method further includes assigning, to a signal of the sensor, a variable that correlates with the operating condition of the plain bearing.

13 Claims, 1 Drawing Sheet

(56) References Cited

U.S. PATENT DOCUMENTS

| | | | |
|---|---|---|---|
| 5,085,315 A * | 2/1992 | Sambell | B64C 27/30 244/6 |
| 5,566,092 A * | 10/1996 | Wang | G01N 29/043 706/912 |
| 6,526,829 B1 | 3/2003 | Lysen et al. | |
| 9,841,352 B2 | 12/2017 | Chen et al. | |
| 2003/0074159 A1 * | 4/2003 | Bechhoefer | G01N 29/46 702/181 |
| 2005/0284225 A1 | 12/2005 | Luo | |
| 2006/0150737 A1 | 7/2006 | Pecher | |
| 2007/0219044 A1 * | 9/2007 | Waide | B64C 27/14 475/336 |
| 2010/0139403 A1 * | 6/2010 | Liang | G01N 29/4454 73/587 |
| 2011/0106510 A1 * | 5/2011 | Poon | G05B 23/0254 703/2 |
| 2014/0216159 A1 | 8/2014 | Gattermann et al. | |
| 2014/0347043 A1 | 11/2014 | Chana | |
| 2015/0177100 A1 * | 6/2015 | Dietz | F03D 17/00 702/182 |
| 2016/0342148 A1 | 11/2016 | Hedin | |
| 2017/0211477 A1 * | 7/2017 | Menheere | F02C 7/32 |
| 2018/0053358 A1 * | 2/2018 | Hale | B64F 5/60 |
| 2019/0063503 A1 * | 2/2019 | Nowoisky | F16C 17/02 |
| 2019/0078974 A1 * | 3/2019 | Nowoisky | G01M 13/021 |

FOREIGN PATENT DOCUMENTS

| | | |
|---|---|---|
| CN | 104160269 A | 11/2014 |
| CN | 106092576 A | 11/2016 |
| DE | 19803956 A1 | 8/1999 |
| DE | 19938721 A1 | 2/2001 |
| DE | 102011006125 A1 | 9/2012 |
| JP | 2007298458 A * | 11/2007 |

* cited by examiner

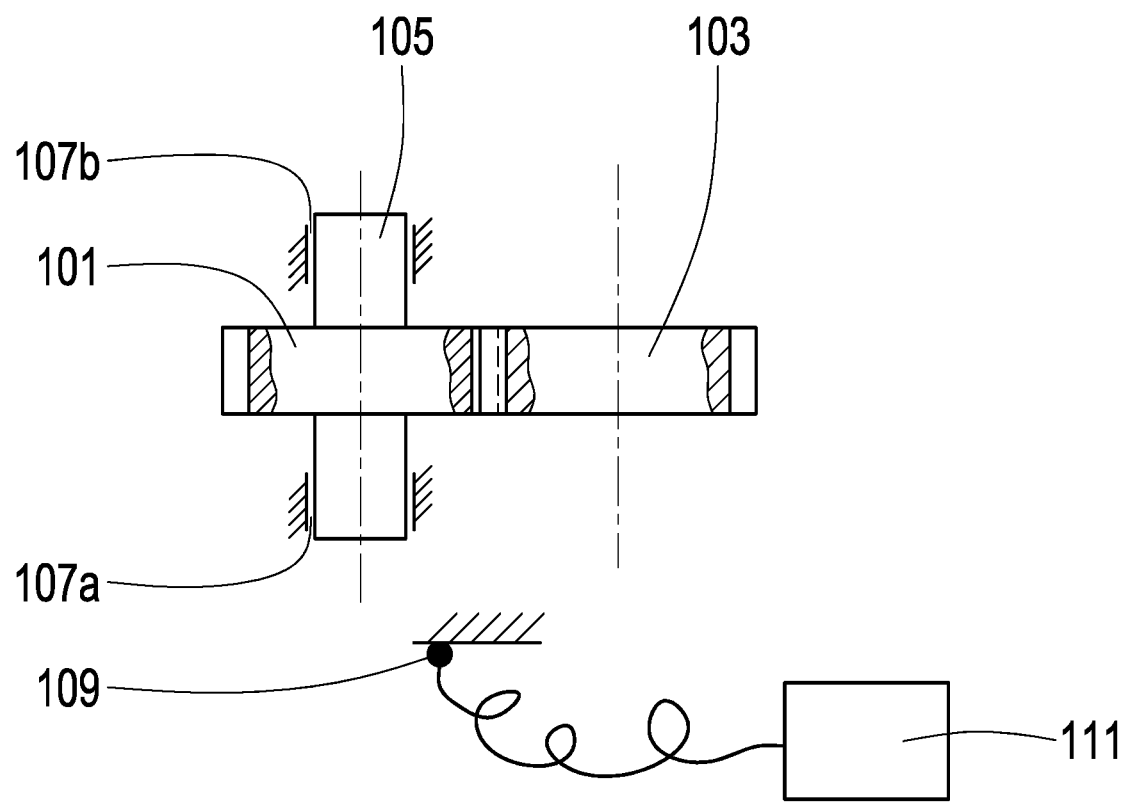

CONDITION MONITORING FOR PLAIN BEARINGS BY MEANS OF STRUCTURE-BORNE NOISE

CROSS REFERENCE TO RELATED APPLICATIONS

This application is a U.S. National Stage Application under 35 U.S.C. § 371 of International Application No. PCT/EP2019/056087 filed on Mar. 12, 2019, and claims benefit to German Patent Application No. DE 10 2018 205 491.6 filed on Apr. 11, 2018. The International Application was published in German on Oct. 17, 2019 as WO 2019/197096 A1 under PCT Article 21(2).

FIELD

The invention relates to a method according to the preamble of claim 1 and to an arrangement according to the preamble of claim 8.

BACKGROUND

In order to detect the state of wear of plain bearings, methods based upon temperature measurements are known from the prior art. In this case, damage to the plain bearing is inferred from an abnormal temperature rise. Another possibility for the monitoring of plain bearings is the metrological determination of the plain bearing gap. In each case, sensors are required, which are introduced directly into the plain bearings. This is, for one thing, complex and expensive and, for another, problematic in view of the available installation space.

In addition, from the prior art, methods for the early detection of damage to transmissions are known which provide for an evaluation of structure-borne noise. For example, the structure-borne noise resulting from a toothed engagement is measured in order to obtain information regarding damage to the toothing. However, such methods cannot be used for plain bearings, since they emit only little sound, and the emitted sound also does not allow conclusions about the state of wear on account of the liquid friction in the plain bearing.

SUMMARY

In an embodiment, the present invention provides a method for determining an operating condition of at least one plain bearing. The method includes measuring, by a sensor, structure-borne noise arising from a toothed engagement of a first gear and a second gear, wherein the first gear is rotatably mounted via the plain bearing and meshes with the second gear. The method further includes assigning, to a signal of the sensor, a variable that correlates with the operating condition of the plain bearing.

BRIEF DESCRIPTION OF THE DRAWINGS

The present invention will be described in even greater detail below based on the exemplary FIGURES. The invention is not limited to the exemplary embodiments. All features described and/or illustrated herein can be used alone or combined in different combinations in embodiments of the invention. The features and advantages of various embodiments of the present invention will become apparent by reading the following detailed description with reference to the attached drawings which illustrate the following:

FIG. 1 illustrates a gear arrangement.

DETAILED DESCRIPTION

The present disclosure provides for improving the determination of the operating condition of a plain bearing in comparison with solutions known from the prior art.

According to the present disclosure, a method is used to determine an operating condition—in particular, a state of wear of a plain bearing. A first gear, which meshes with a second gear, is mounted by means of the plain bearing. The first gear can be fixed, for example, on a shaft which is rotatably mounted by means of the plain bearing. It is also possible to fix the first gear directly on the plain bearing or an outer ring of the plain bearing, or to integrate the outer ring of the plain bearing into the gear in one piece.

If the first gear and the second gear rotate, and a torque is transmitted between the two gears, structure-borne noise arises in the toothed engagement, i.e., in the intermeshing toothings of the first gear and the second gear. Structure-borne noise is sound that propagates in a structure. In the present case, the structure-borne noise propagates in the first gear and the second gear, and is transmitted to surrounding transmission parts and can be measured there by means of a sensor. In particular, it is possible to measure the structure-borne noise on a transmission housing.

Different sensors for vibration detection, such as, for example, structure-borne noise sensors, acceleration sensors, MEMS, or also by the shock pulse method, are suitable for measuring the structure-borne noise.

According to the present disclosure, a signal of the sensor is assigned a variable that correlates with the operating condition of the plain bearing. This means that the operating condition of the plain bearing is assessed from the toothed engagement of the first gear and the second gear on the basis of the structure-borne noise measured by means of the sensor. This is possible because, with progressive wear of the plain bearing, its bearing gap increases. This results in a displacement, i.e., a change in the position of the first gear relative to the second gear. The displacement of the first gear changes the anatomy of the toothed engagement and, associated therewith, the structure-borne noise resulting from the toothed engagement.

The variable assigned to the signal of the sensor may be a physical parameter that characterizes the condition of the plain bearing. It is thus possible, for instance, to select the absolute or relative bearing play of the plain bearing as a variable. It is also possible to assign an evaluation to the signal of the sensor. The evaluation can be carried out quantitatively, by assigning a reference number to the signal, or qualitatively. With a qualitative evaluation, the signal of the sensor is divided into one of several categories. A naming of the categories thereby represents the variable. Thus, the signal can be divided, for example, into the two categories, "in order" and "not in order." If, on the basis of the signal of the sensor, it is assumed that the plain bearing has not yet reached its wear limit, it is considered to be "in order." It is, correspondingly, considered to be "not in order" if it can be assumed that the plain bearing has exceeded its wear limit.

The determination of the operating condition of the plain bearing by means of a sensor which measures structure-borne noise is comparatively simple, since the sensor can be arranged outside the plain bearing—for example, in a transmission housing. In addition, generally available standard sensors can be used. It is not necessary to specially manufacture sensors for installation in the plain bearing.

The measured signal of the sensor usually contains not only the structure-borne noise from the toothed engagement of the first gear and the second gear, but also structure-borne noise generated by other transmission parts. In a preferred additional embodiment, such interfering signals are filtered out of the measured signal, such that the filtered signal corresponds to a signal of the structure-borne noise from the toothed engagement. The filtered signal includes the signal components representing the structure-borne noise produced by the intermeshing toothings of the first gear and the second gear. Preferably, only such signals are included in the filtered signal. Filtering the signal simplifies the evaluation of the operating condition of the plain bearing.

Certain operating conditions of the plain bearing are accompanied by a characteristic frequency spectrum and/or order spectrum of the structure-borne noise resulting from the toothed engagement of the first gear and the second gear. Therefore, in a preferred additional embodiment, a frequency spectrum and/or an order spectrum of the measured signal of the sensor and/or of the filtered signal is calculated in order to assign the variable which correlates with the operating condition of the plain bearing. In particular, an envelope spectrum, a cepstrum, and/or a curtosis can be calculated.

The structure-borne noise from the toothed engagement of the first gear and the second gear is dependent not only upon the operating condition of the plain bearing, but also upon a rotational speed of the first gear and the second gear, a temperature of the plain bearing, and a torque with which the gears are acted upon. In a preferred additional embodiment, one or more such variables are therefore detected and included in the assignment of the variable to the measured signal of the sensor.

The variable correlated with the operating condition of the plain bearing can be assigned to the signal of the sensor by comparing the signal with reference signals previously measured on plain bearings with known operating conditions. If the signal matches such a reference signal, the variable corresponding to the operating condition of the plain bearing at which the matching reference signal was measured is assigned to the signal.

Alternatively, the assignment can be implemented in a model-based manner. In a preferred additional embodiment, the structure-borne noise arising from the toothed engagement of the first gear and the second gear and/or the signal of the sensor and/or the filtered signal and/or the frequency spectrum and/or the order spectrum of the signal or the filtered signal is accordingly determined by simulation using a model of the first gear, the second gear, and the plain bearing. The model used can be a physical or analytical model and/or an artificial neural network (ANN) trained by machine learning. The model is capable of imaging the operating condition of the simulated plain bearing. By matching the measured signal with the simulation, the operating condition of the plain bearing being examined can be determined.

The method is preferably further developed in such a manner that the simulation is carried out iteratively over several operating conditions of the simulated plain bearing. In each iteration, a model with a plain bearing having a different operating condition is used. Simulation results for various operating conditions can thus be obtained and compared with the plain bearing being examined or with the measured signal of the sensor.

In a further preferred additional embodiment, the variables determined by simulation are, accordingly, in each case compared with a corresponding variable ascertained by measurement.

An arrangement according to the present disclosure has a plain bearing, a first gear, a second gear, a sensor, and an evaluation unit. The first gear is mounted by means of the plain bearing and, optionally, at least one additional plain bearing, and meshes with the second gear. The sensor is designed to measure structure-borne noise arising from a toothed engagement of the first gear and the second gear or of a toothing of the first gear and a toothing of the second gear. According to the invention, the evaluation unit implements the method according to the invention or a preferred additional embodiment, i.e., the evaluation unit is designed to carry out such a method.

A preferred exemplary embodiment of a gear arrangement is shown in FIG. 1.

A first gear 101 and a second gear 103 of the arrangement shown in FIG. 1 mesh with each other. The first gear 101 is fixed on a shaft 105 which is rotatably mounted by means of a first plain bearing 107a and a second plain bearing 107b.

As a result of wear of the first plain bearing 107a and the second plain bearing 107b, increased bearing play arises. This increases the radial mobility of the shaft 105 and the first gear 101. As a result, upon loading, an axial distance of the first gear 101 and the second gear 103 is increased. This affects the toothed engagement of the first gear 101 and the second gear 103 and causes a change in noise emissions.

The noise emissions are measured by means of a sensor 109 and evaluated in a control unit 111. The measured noise emissions serve the control unit 111 as an indicator of the state of wear of the first plain bearing 107a and the second plain bearing 107b. A change in noise emissions that follows a particular pattern, which may be determined, for instance, by reference measurements, indicates wear in the bearings 107a, 107b.

While the invention has been illustrated and described in detail in the drawings and foregoing description, such illustration and description are to be considered illustrative or exemplary and not restrictive. It will be understood that changes and modifications may be made by those of ordinary skill within the scope of the following claims. In particular, the present invention covers further embodiments with any combination of features from different embodiments described above and below.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

LIST OF REFERENCE NUMERALS

101 First gear
103 Second gear
105 Shaft
107a First plain bearing
107b Second plain bearing
109 Sensor
111 Control unit

The invention claimed is:

1. A method for determining an operating condition of at least one plain bearing, the method comprising:
   measuring, by a sensor, structure-borne noise arising from a toothed engagement of a first gear and a second gear, wherein the first gear is rotatably mounted via the plain bearing and meshes with the second gear;
   assigning, to a signal of the sensor, a variable that correlates with an absolute or relative bearing play of the plain bearing; and
   filtering the signal, wherein the filtered signal corresponds to a signal of the structure-borne noise arising from the toothed engagement,
   wherein a simulated structure-borne noise from the toothed engagement of the first gear and the second gear, a simulated signal of the sensor, and a simulated filtered signal are determined by simulation using a model of the first gear, the second gear, and the plain bearing, and
   wherein the model images the operating condition of the plain bearing correlating with the absolute or relative bearing play.

2. The method according to claim 1, further comprising calculating a frequency spectrum and/or an order spectrum of the signal and/or of the filtered signal.

3. The method according to claim 1, further comprising detecting a rotational speed of the first gear and/or a temperature of the plain bearing and/or a torque applied to the first gear.

4. The method according to claim 2, wherein a simulated frequency spectrum and/or a simulated order spectrum of the signal or filtered signal is determined by simulation using the model of the first gear, the second gear, and the plain bearing.

5. The method according to claim 1, wherein the simulation is carried out iteratively over several operating conditions of the plain bearing.

6. The method to claim 1, wherein the variables determined by simulation are in each case compared with a corresponding variable ascertained by measurement.

7. The method to claim 1, comprising arranging the sensor on or in a component other than the plain bearing.

8. The method of claim 7, wherein the sensor is arranged on a surface of a transmission housing, the at least one plain bearing, the first gear, and the second gear being arranged within the transmission housing.

9. The method according to claim 1, wherein the model is an artificial neural network trained by machine learning.

10. An arrangement, comprising:
    at least one plain bearing;
    a first gear mounted via the plain bearing;
    a second gear with which the first gear meshes;
    a sensor configured to measure structure-borne noise from a toothed engagement of the first gear and the second gear; and
    a controller configured to assign, to a signal of the sensor, a variable that correlates with an absolute or relative bearing play of the plain bearing,
    wherein the controller is further configured to filter the signal, wherein the filtered signal corresponds to a signal of the structure-borne noise arising from the toothed engagement, and
    wherein the controller is configured to simulate structure-borne noise from the toothed engagement of the first gear and the second gear, signals of the sensor, and filtered signals using a model of the first gear, the second gear, and the plain bearing, and
    wherein the model images the operating condition of the plain bearing correlating with the absolute or relative bearing play.

11. The arrangement of claim 10, wherein the sensor is arranged on or in a component other than the plain bearing.

12. The arrangement of claim 11, wherein the sensor is arranged on a surface of a transmission housing, the at least one plain bearing, the first gear, and the second gear being arranged within the transmission housing.

13. A method for determining a bearing gap of at least one plain bearing, the method comprising:
    measuring, by a sensor, structure-borne noise arising from a toothed engagement of a first gear and a second gear, wherein the first gear is rotatably mounted via the plain bearing and meshes with the second gear;
    assigning, to a signal of the sensor, a variable that correlates with the bearing gap of the plain bearing; and
    filtering the signal, wherein the filtered signal corresponds to a signal of the structure-borne noise arising from the toothed engagement,
    wherein a simulated structure-borne noise from the toothed engagement of the first gear and the second gear, a simulated signal of the sensor, and a simulated filtered signal are determined by simulation using a model of the first gear, the second gear, and the plain bearing, and
    wherein the model images an operating condition of the plain bearing correlating with the bearing gap.

* * * * *